O. M. POND.
Improvement in Combined Plows and Markers.

No. 114,472.

Patented May 2, 1871.

Witnesses
Jno. A. Ellis
Jas. V. White

Inventor
O. M. Pond.
per
J. H. Alexander
Atty

UNITED STATES PATENT OFFICE.

ORLANDO M. POND, OF INDEPENDENCE, IOWA.

IMPROVEMENT IN COMBINED PLOW AND MARKER.

Specification forming part of Letters Patent No. 114,472, dated May 2, 1871.

*To all whom it may concern:*

Be it known that I, O. M. POND, of Independence, in the State of Iowa, have invented certain new and useful Improvements in a Combined Plow and Marker; and I do hereby declare that the following is a full, clear, and exact description thereof, reference being had to the accompanying drawings, and to the letters of reference marked thereon, which form a part of this specification.

The nature of my invention consists in the construction and arrangement of a combined corn plow and marker, as will be hereinafter fully set forth.

In order to enable others skilled in the art to which my invention appertains to make and use the same, I will now proceed to describe its construction and operation, referring to the annexed drawings, in which—

Figure 1:
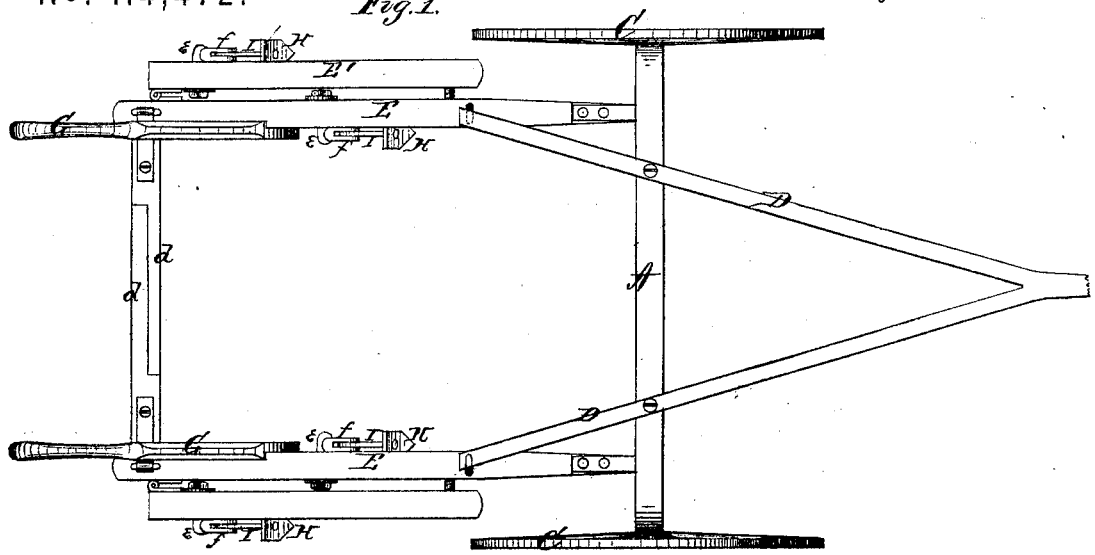
Figure 2:
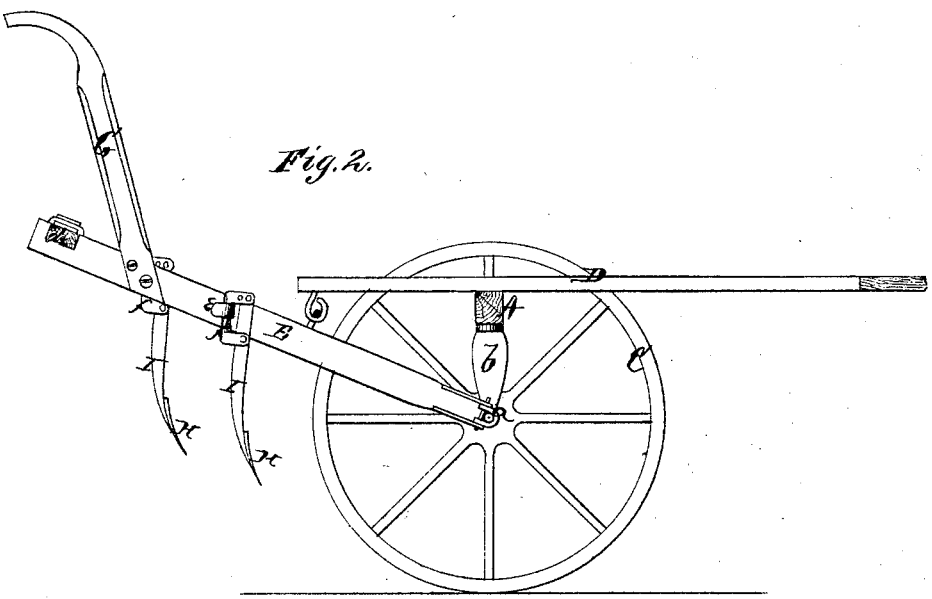

Figure 1 is a plan view, and Fig. 2 a longitudinal vertical section.

A represents the main axle, at the ends of which are downward-projecting arms or ears $b\ b$, forming at their lower ends boxes or bearings. In each of these is placed a spindle, upon the outer end of which the wheel C revolves.

On the axle A are secured two bars, D D, extending a suitable distance in rear, and their front ends joined together, forming the tongue of the machine. The spindles, upon which the wheels are placed, are grooved on their inner ends for the purpose of bringing the main arms E E, which are placed on said spindles, nearer together, so as to plow corn, or of throwing them apart, so as to mark when desired.

At the rear ends of the main arms E E are hinged bars $d\ d$, which lap each other, as shown in Fig. 1, and are joined together by a set-screw or other suitable means. These bars also answer the purpose of regulating the distance between the main arms E E; or they may be removed altogether when plowing corn. The handles G G are secured to the inner sides of the arms E E.

On the outer side of each arm E, near the rear end, is hinged another arm, E′, placed parallel with the former, and secured by a screw, bolt, or other means when the machine used for plowing.

To each of the bars E and E′ is attached a shovel-plow, H, in the following manner: The shovel is bolted firmly upon a wrought-iron arm, I, and attached to the main wooden arms by an iron, $f$.

The iron $f$ consists of a round bar confined in a vertical position by a clamp or staple, $e$, and has its ends bent at right angles, said ends running parallel with each other. These ends are slotted or forked, and in the lower one the shovel-arm I is pivoted, while it is held by a wooden pin in the upper. It will be noticed that the iron $f$ can be turned so as to cause the plows to throw the dirt to or from the corn-row; and, also, when it strikes anything firm it will break the wooden pin at the top and fall back without any damage. The plows on the hinged arms E′ may be removed, the arms extended, and the plows put back, with the points fronting the horses, ready for marking for corn.

At the ends of the arms E′ are two or more holes for the purpose of regulating the distance between the marks.

The clevis or jointed band $a$, where the main arm E connects with and attaches to the spindle, is made loose and jointed, so as to give the plow a lateral as well as an upward motion at any time when required to avoid a hill of corn, or to hitch them up when not in use, such as turning around or going to or from the field.

Having thus described my invention, what I claim as new, and desire to secure by Letters Patent, is—

1. The iron $f$, constructed as described, and attached by means of the staple $e$ or other suitable means, for the purpose of holding and adjusting the plow-arm I, substantially as herein set forth.

2. The arrangement of the axle A $b$, wheels C C, tongue D, clevises $a\ a$, arms E E and E′ E′, handles G G, bars $d\ d$, plows H H, plow-arms I I, irons $f f$, and clamps $e\ e$, all constructed and arranged substantially as and for the purposes herein set forth.

In testimony that I claim the foregoing as my own I affix my signature in presence of two witnesses.

O. M. POND.

Witnesses:
   J. S. WOODWARD,
   W. M. CONE.